United States Patent
Senior

(10) Patent No.: US 8,270,675 B2
(45) Date of Patent: Sep. 18, 2012

(54) APPROACH FOR RESOLVING OCCLUSIONS, SPLITS AND MERGES IN VIDEO IMAGES

(75) Inventor: Andrew W. Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/229,026

(22) Filed: Sep. 9, 2011

(65) Prior Publication Data

US 2011/0317920 A1    Dec. 29, 2011

Related U.S. Application Data

(62) Division of application No. 11/691,119, filed on Mar. 26, 2007, now Pat. No. 8,086,036.

(51) Int. Cl.
*G06K 9/00* (2006.01)
(52) U.S. Cl. ...................................................... 382/103
(58) Field of Classification Search .................. 382/103, 382/106, 173, 195, 286, 291
See application file for complete search history.

(56) References Cited

U.S. PATENT DOCUMENTS

| | | | |
|---|---|---|---|
| 6,542,621 B1 | 4/2003 | Brill et al. | |
| 6,865,289 B1 | 3/2005 | Berestov | |
| 6,950,123 B2 | 9/2005 | Martins | |
| 7,639,841 B2 * | 12/2009 | Zhu et al. | 382/104 |
| 7,720,257 B2 * | 5/2010 | Morellas et al. | 382/103 |
| 7,778,445 B2 | 8/2010 | Au | |
| 2004/0252763 A1 | 12/2004 | Mertens | |
| 2007/0002058 A1 | 1/2007 | Wittebrood | |

OTHER PUBLICATIONS

Senior et al., "Appearance Models for Occlusion Handling," 8 pages, retrieved from: http://www.research.ibm.com/peoplevision/PETS2001.pdf, 2001.
Senior, "Tracking with Probabilistic Appearance Models," pp. 1-8, retrieved from: http://www.research.ibm.com/peoplevision/PETS2002.pdf, 2002.
Tran, Notice of Allowance and Fee(s) Due for U.S. Appl. No. 11/691,119 dated Aug. 8, 2011, 5 pages.
Tran, Office Action Communication for U.S. Appl. No. 11/691,119 dated Apr. 14, 2011, 9 pages.

\* cited by examiner

*Primary Examiner* — Phuoc Tran
(74) *Attorney, Agent, or Firm* — Hoffman Warnick LLC; Anna L. Linne

(57) ABSTRACT

Aspects of the present invention provide a solution for resolving an occlusion in a video image. Specifically, an embodiment of the present invention provides an environment in which portions of a video image in which occlusions have occurred may be determined and analyzed to determine the type of occlusion. Furthermore, regions of the video image may be analyzed to determine which object in the occlusion the region belongs to. The determinations and analysis may use such factors as pre-determined attributes of an object, such as color or texture of the object and/or a temporal association of the object, among others.

4 Claims, 7 Drawing Sheets

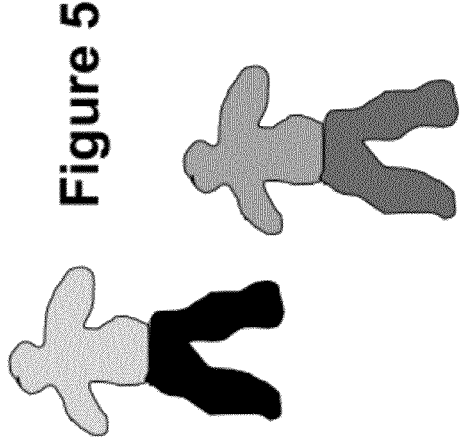
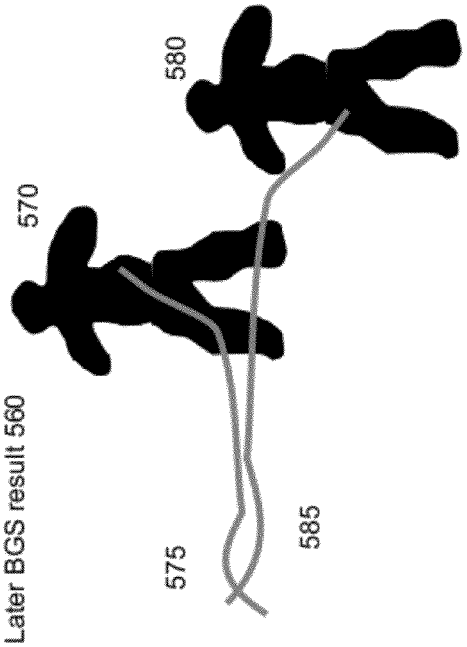
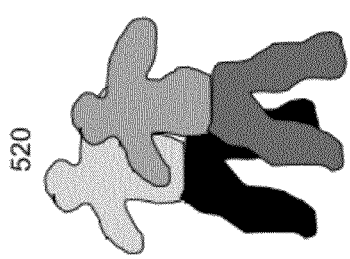
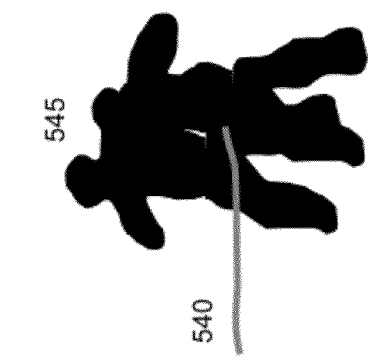
Figure 5

APPROACH FOR RESOLVING OCCLUSIONS, SPLITS AND MERGES IN VIDEO IMAGES

CROSS-REFERENCE TO RELATED APPLICATIONS

This application is a Divisional of U.S. patent application Ser. No. 11/691,119, filed Mar. 26, 2007 U.S. Pat. No. 8,086,036 issued Dec. 27, 2011, which is hereby incorporated by reference.

FIELD OF THE INVENTION

Aspects of the present invention generally relate to video imaging. Specifically, aspects of the present invention provide a solution for resolving an occlusion in a video image.

BACKGROUND OF THE INVENTION

Video imaging is a quickly evolving field that involves the use of image capture technology, such as a camera, to capture and/or store images. Its usefulness includes the ability to capture images without having a human present and/or to store details of an event and/or object that no human could remember and/or accurately convey to others. To this extent, video imaging is often used in places where it is difficult or impossible to go (e.g., inside the human body, outer space, etc.) and/or in places where there is a shortage of humans needed for observation (e.g., security).

In the past, imaging technology has been limited to simply capturing and/or storing information. However, these systems may require users to manually traverse large amounts of data to obtain results from the specific event and/or object that they are interested in. These systems may be thought of as reactive because analysis can only be performed after the system has captured and stored the image.

In contrast, present day users desire "smart systems" for providing automatic analysis of the information that they capture. For example, in the area of security, users may desire that the system be able to analyze the data and provide the user with specific events, such as those that differ from the norm. Furthermore, users may desire these systems to be proactive, that is, to analyze information as it is being received and to take some action if the data indicates that a certain event may be occurring.

One difficulty in providing "smart systems" that have the functionality that users desire has been the difficulty in resolving occlusions. An occlusion is an event in which, from the perspective of the video imaging instrument, two or more objects occupy the same area of the captured frame. For example, if two cars are driving in the same direction and one car passes the other, the car that is "in front" with respect to the perspective of the video imaging instrument will occlude the cars that is "behind." From the perspective of the video imaging instrument it will appear that one car has partially or fully disappeared or that the two cars have merged together to form one single object. Another example involves a situation in which two or more objects enter the "view" of the video imaging instrument while an occlusion is occurring. In this example, the system may have difficulty determining whether the occlusion contains one object or more than one object. Furthermore, if the occlusion resolves itself while in the "view" of the video imaging device, it may be difficult for the system to determine whether the now multiple objects or single object should be classified as a single object or multiple objects.

In view of the foregoing, there exists a need for a solution that overcomes one or more of the shortcomings of the prior art.

SUMMARY OF THE INVENTION

In general, aspects of the present invention provide a solution for resolving an occlusion in a video image. Specifically, an embodiment of the present invention provides an environment in which portions of a video image in which occlusions have occurred may be determined and analyzed to determine the type of occlusion. Furthermore, regions of the video image may be analyzed to determine which object in the occlusion the region belongs to. The determinations and analysis may use such factors as pre-determined attributes of an object, such as color or texture of the object and/or a temporal association of the object, among others.

A first aspect of the present invention provides a method for resolving an occlusion in a video image, comprising: detecting a plurality of foreground regions in a series of video images; associating a foreground region with one or more tracked objects; determining whether any object of the plurality of objects may occlude or be occluded by another object of the plurality of objects by comparing current attributes and object models of each of the objects with the video image and plurality of foreground regions; assigning pixels overlapped by either object model to one or other of the object and the another object; and performing an analysis of an unresolved region to associate the unresolved region with one of the objects or to assign the region with designation ambiguous region.

A second aspect of the present invention provides a system for resolving an occlusion in a video image, comprising: an object detector for detecting a plurality of foreground regions in a series of video images and associating a foreground regions with one or more tracked objects; an occlusion determinator for determining whether any object of the plurality of objects may occlude or be occluded another object by comparing current attributes and object models of each of the objects with the video image and plurality of the foreground regions; and a region analyzer for assigning regions overlapped by either object model to one of the object and the another object and for performing an analysis of an unresolved region to associate the unresolved region with one of the object of the another object or to assign the region with designation ambiguous region.

A third aspect of the present invention provides a program product stored on a computer readable medium for resolving an occlusion in a video image, the computer readable medium comprising: program code for detecting a plurality of foreground regions in a series of video images; program code for associating a foreground regions with one or more tracked objects; program code for determining whether any object of the plurality of objects may occlude or be occluded by another object of the plurality of objects by comparing current attributes and object models of each of the objects with the video image and plurality of foreground regions; program code for assigning the unresolved region to the object if the unresolved region is adjacent to a region that is assigned to the object; and program code for performing an analysis of an unresolved region to associate the unresolved region with one of the objects or to assign the region with designation ambiguous region.

A fourth aspect of the present invention provides a method for deploying a system for resolving an occlusion in a video image, comprising: providing a computer infrastructure being operable to: detect a plurality of foreground regions in a series of video images; associate a foreground region with one or more tracked objects; determine whether any object of the plurality of objects may occlude or be occluded by another object of the plurality of objects by comparing current attributes and object models of each of the objects with the video image and plurality of foreground regions; assign pixels overlapped by either object model to one or other of the object and the another object; and perform an analysis of an unresolved region to associate the unresolved region with one of the objects or to assign the region with designation ambiguous region.

A fifth aspect of the present invention provides computer software embodied in a propagated signal for resolving an occlusion in a video image, the computer software comprising instructions for causing a computer system to perform the following: detect a plurality of foreground regions in a series of video images; associate a foreground region with one or more tracked objects; determine whether any object of the plurality of objects may occlude or be occluded by another object of the plurality of objects by comparing current attributes and object models of each of the objects with the video image and plurality of foreground regions; assign pixels overlapped by either object model to one or other of the object and the another object; and perform an analysis of an unresolved region to associate the unresolved region with one of the objects or to assign the region with designation ambiguous region.

A sixth aspect of the present invention provides a method for resolving an occlusion in a video image, the method comprising managing a computer infrastructure that performs the process described herein; and receiving payment based on the managing.

A seventh aspect of the present invention provides a method for determining, if an object has split, whether the object should be classified into multiple objects, comprising: creating a fission model that tracks a tendency of the object to include multiple non-contiguous regions; tracking, in association with the object, a region that is in close proximity with the object; accumulating, based on the fission model, evidence that the region and the object should be separate; making, based on the accumulated evidence, a determination that the region and the object should be classified into multiple objects; and tracking the region and the object as separate objects.

An eighth aspect of the present invention provides a method for determining whether multiple objects should be classified as a single object, comprising: creating a fusion model that tracks a tendency of the multiple objects to include behave in a similar manner; tracking, in association with an object, one or more other objects that are in close proximity with the object; accumulating, based on the fusion model, evidence that the multiple objects should be classified as one object; making, based on the accumulated evidence, a determination that the objects should be classified as one object; and tracking the objects as one object.

Therefore, the present invention provides a method, system, and program product for resolving an occlusion in a video image.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 5 shows an illustration in which a tracked object splitting into two objects may be resolved according to one embodiment of the claimed invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the present invention provide a solution for resolving an occlusion in a video image. Specifically, an embodiment of the present invention provides an environment in which portions of a video image in which occlusions have occurred may be determined and analyzed to determine the type of occlusion. Furthermore, regions of the video image may be analyzed to determine which object in the occlusion the region belongs to. The determinations and analysis may use such factors as pre-determined attributes of an object, such as color or texture of the object and/or a temporal association of the object, among others.

Figure 1:
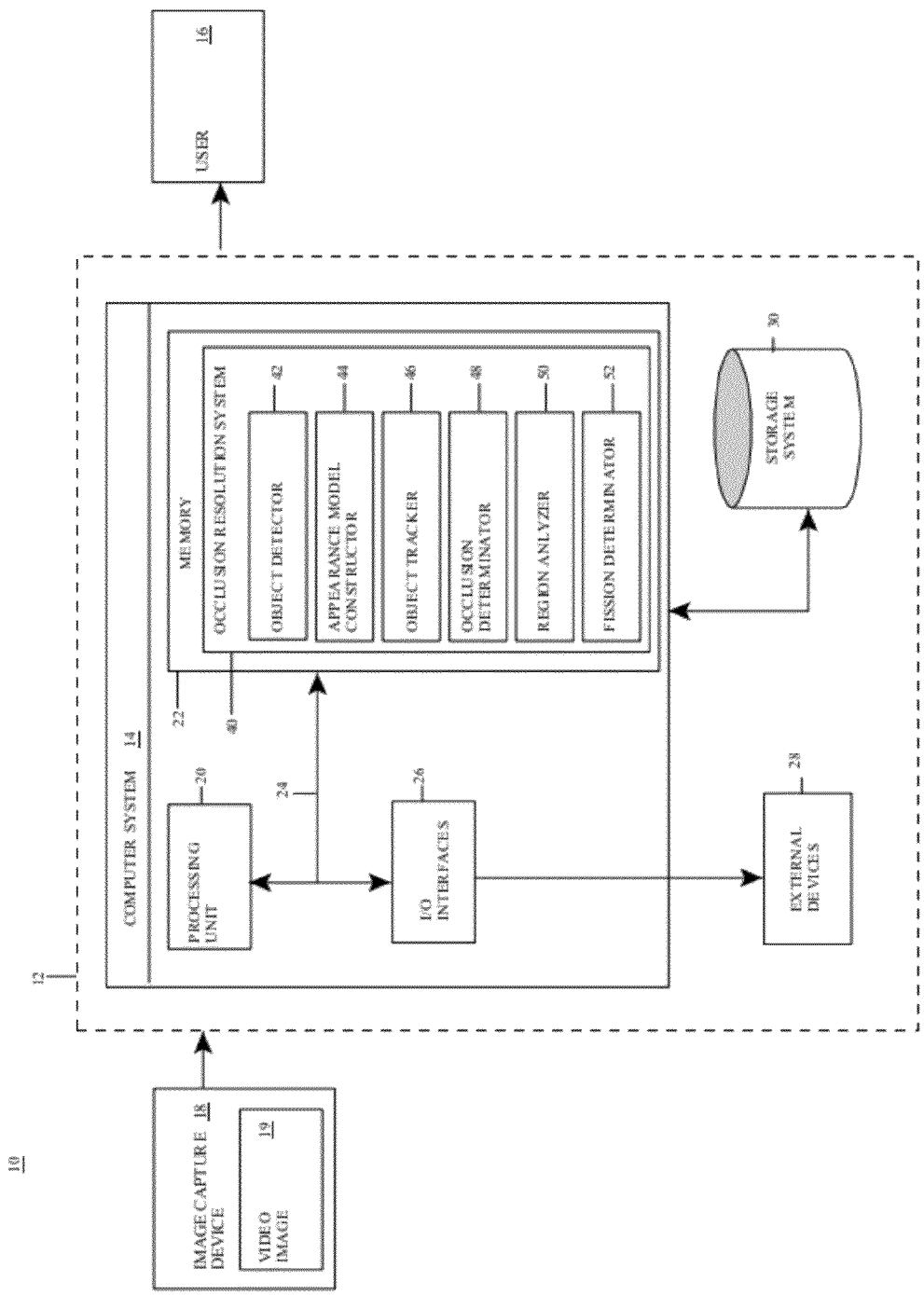
FIG. 1 shows an illustrative computer infrastructure for resolving an occlusion in a video image according to an embodiment of the present invention.

Referring now to FIG. 1, a system 10 for resolving an occlusion in a video image according to an embodiment of the present invention is shown. Specifically, FIG. 1 depicts a system 10 in which an occlusion in a video image 19 sent by a video capture device 18 can be detected, analyzed, its type determined, and regions of video image 19 can be associated with the correct objects. The results can then be further analyzed by a smart system, such as a smart surveillance system, and/or the results may be forwarded to a user 16 and/or used to initiate some action.

Referring again to FIG. 1, as depicted, system 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by a conventional TCP/IP sockets-based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to create a workflow that defines a business process.

As shown, computer system 14 includes a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as an occlusion resolution system 40, which is stored in memory 22 and/or storage system 30. While executing computer program code, processing unit 20 can read and/or write data to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the process of the invention. Moreover, computer system 14 is only representative of various possible computer systems that can include numerous combinations of hardware and/or software. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28. Still further, it is understood that one or more additional components (e.g., system software, math co-processing unit, etc.) not shown in FIG. 1 can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention. For example, storage system 30 may be used to store one or more video image 19 obtained from image capture device 18 and/or an object in which an occlusion has been resolved as a result using system 10. In addition, storage system 30 may be used to store information used resolve an occlusion in video image 19, such as an object model and/or a temporal association. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is an occlusion resolution system 40, which is a software program that provides the functions of the present invention. Occlusion resolution system 40 provides a system for resolving an occlusion in video image 19 provided by video capture device 18. To this extent, occlusion resolution system 40 includes an object detector 42, an object model constructor 44, an object tracker 46, an occlusion determinator 48, a region analyzer 50, and a fission determinator 52.

Figure 3:
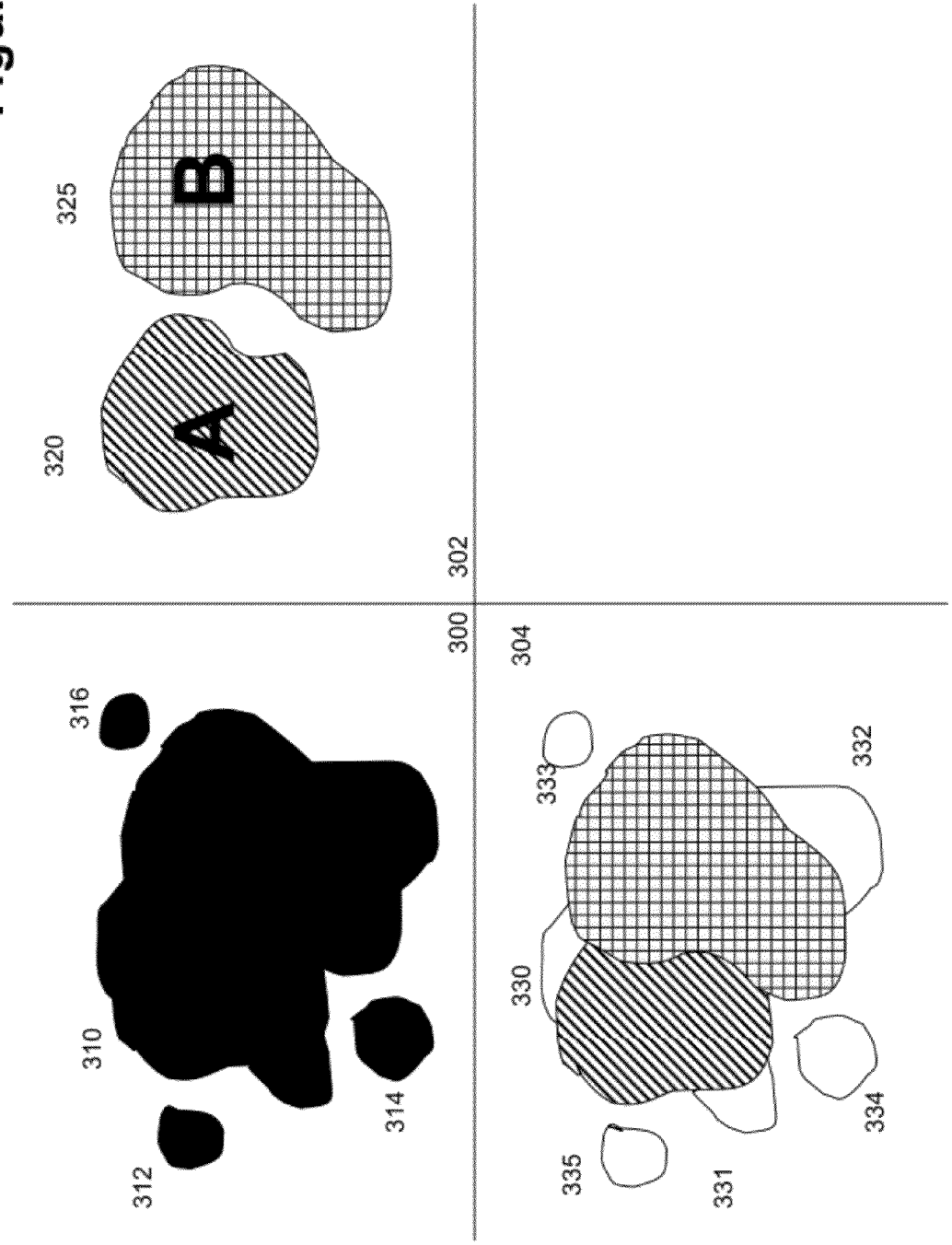
FIG. 3 shows an illustration of an occlusion to be resolved according to one embodiment of the claimed invention.

Object detector 42 detects "foreground regions" in video image 19. A foreground region may be thought of as an area of interest, typically caused by moving objects and often detected using background subtraction methods or detectors for specific object classes (such as faces or vehicles). Once one or more foreground regions are detected, they may be classified into one or a plurality of objects by object detector 42. Detection done by object detector 42 may take the form of detection of an object that has been captured in a previous video image 19 or, in the alternative, may involve detecting an object that has just entered video image 19. The object that is detected by object detector may be a non-occluded object, such as objects 320 and 325 (FIG. 3) or, in the alternative, may contain an occlusion such as in camera view 304 (FIG. 3). In any case, the object may be detected by evaluating such factors as changes in the color, texture, etc., of a region (such as a pixel) or regions in video image 19; by evaluating the position of the object in one or more previous video images 19; or in any manner now known or later developed in the art. Methods for using object models to track moving objects in the video streams are described in *Appearance models for Occlusion Handling* A. Senior, A. Hampapur, Y-L Tian, L. Brown, S. Pankanti, R. Bolle *in proceedings of Second International workshop on Performance Evaluation of Tracking and Surveillance systems in conjunction with CVPR'01* December 2001. and *Tracking with Probabilistic Appearance models* A. W. Senior *in proceedings ECCV workshop on Performance Evaluation of Tracking and Surveillance Systems* 1 June 2002 pp 48-55, which is incorporated herein by reference in its entirety.

Object model constructor 44 constructs an object model that has attributes of the detected object, which may include attributes that include the appearance of the object. Object model constructor 44 may contain a single set of attributes or, in the alternative, may contain multiple sets of attributes that reflect changes in the object during the time in which the object has been in the video image. These attributes may include, but not be limited to color, texture, position, and expected position.

Object tracker 46 allows a temporal association of detected foreground regions with tracked objects and tracks movement of the objects over a set of visual images 19. To this extent, the object may be associated with one or more vectors that indicate a direction of movement of the object, one or more values that indicate the speed of all or a portion of the object, and/or a normalized value that indicates an average speed of one or more portions of the object over time. For example, in the case of a human that swings its arms while walking, temporal association may contain one or more vectors, speed values and/or normalized values for each of the torso, legs, arms, etc.

Occlusion determinator 48 determines whether two objects may be occluding one another. In making this determination, occlusion determinator 48 may, based on the positions of the two objects within video image 19, and the detected foreground region or regions near to the objects, conclude that the objects are sufficiently close that a likelihood exists that one object occludes the other. Occlusion determinator 48 may also compare current attributes of two or more objects in the series of video images and their object models. In doing so, occlusion determinator 48 may make use of the object model that has been previously constructed by object model constructor 44 to make a determination that an occlusion has occurred. Still further, if the expected paths based on the temporal association created by object tracker 46 of two or more objects indicate that the objects would overlap or nearly overlap in the new frame, then occlusion determinator 48 may conclude that an occlusion has occurred.

Figure 2:
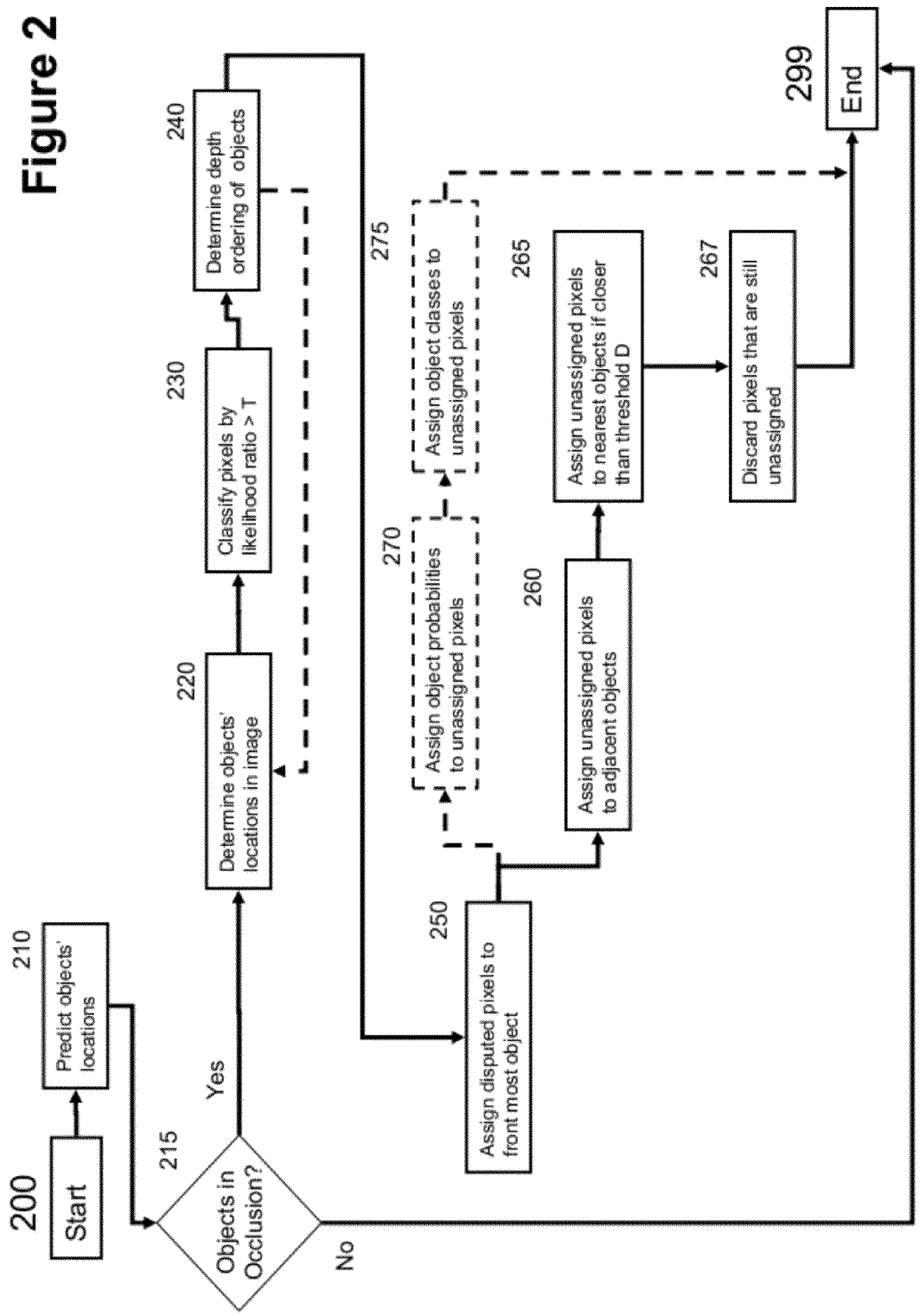
FIG. 2 shows an example of an example of a possible sequence of operations in resolving an occlusion according to one embodiment of the present invention.

Referring now to FIG. 2 in conjunction with FIG. 1, FIG. 2 illustrates an exemplary use of a surveillance system having system 10 in an environment in which an image has been captured by video capture device 18, such as a camera, starting with process 200 and ending with process 299. The flow begins in process 200 with the assumption that a plurality of objects have been detected by object detector 42 and tracked using object tracker 46 in previous images from the same video capture device 18. One such surveillance system is known as the "Smart Surveillance System" and is described in A. Hampapur, L. Brown, J. Connell, S. Pankanti, A. W. Senior, and Y.-L. Tian, *Smart Surveillance: Applications, Technologies and Implications*, IEEE Pacific-Rim Conference on Multimedia, Singapore, December 2003, which is incorporated herein by reference in its entirety.

In process 210, the positions of the objects are predicted, for instance by a Kalman filter based on the temporal associations of the objects. Using the predicted positions, occlusion determinator 48 decides in process 215 if any of the objects might be occluding one another, and, if so, further processes of this invention are invoked. In process 220 the object positions in the image are estimated using one of a variety of object location or detection techniques, for instance image correlation. In process 230 pixels in the image of the objects are classified based on a likelihood that they belong to the object or another object in the occlusion. This may be done by comparing the current attributes of the object 310 with the object models of the two objects 320, 325. In process 240, based on this determination, the system can determine the depth ordering (relative distance from the camera) of the objects, for instance by relative counts of the number of pixels that were assigned to each object, and in process 250, each pixel that overlaps with one or more of the areas that are believed to be covered by the objects are assigned to the front most of the objects that overlap that pixel. For instance in the detected foreground regions 310, 312, 314, 316 shown in 300 (FIG. 3) may be associated with tracked objects 320, A, and 325, B, in steps 200-250 resulting in the assignment shown in frame 304. This invention discloses methods to deal with the, as yet, unresolved regions 330, 331, 332, 333, 334, 335.

Referring again to FIGS. 1, 2 and 3 concurrently, region analyzer 50 performs an analysis of an unresolved region to associate the unresolved region with one of the objects or to assign the region as ambiguous. In performing its task, region analyzer may analyze all or merely a subset of regions that have been determined to be unresolved. Region analyzer 50 may perform its function using a multi-process analysis and association or, in the alternative, a single process may be used.

Once the initial analyzer and initial region assigner have performed their tasks, or in the case of a single process, region analyzer 50 may perform advanced analysis in an attempt to match a region with its appropriate object 320, 325. Region assigner 50 may simply analyze regions that have not been previously assigned 330, 331, 332, 333, 334, and 335, as illustrated in frame 304. In the alternative, region analyzer 50 may also reassign regions that have previously been assigned. This reassignment may occur due to such factors as a background color and/or texture that are similar to a portion of one of the objects, an initial assignment to one object of a region that further analysis demonstrates to be incorrect, etc.

In doing so, region analyzer 50 may use one or a variety of different factors to assign an unresolved region 330-335. For example, region analyzer 50 may assign the unresolved region to one of the identified objects in the occlusion if the unresolved region is encompassed by regions that are assigned to the object. Furthermore, or in the alternative, region analyzer 50 may assign the unresolved region to an object if the unresolved region is contiguous with a region that is assigned to the object. Using this determination, region analyzer 50 would assign unresolved region 331 to region A 320 and unresolved region 332 to region B 325, as shown in process 260 (FIG. 2). Still further, or in the alternative, region analyzer 50 may assign the unresolved region to the object if the unresolved region is closer in proximity to the object than to the occluding object, as shown if process 265 (FIG. 2). Under this analysis, unassigned region 335 would be assigned to object A 320 and unassigned region 333 would be assigned to object B 325. Yet still further, or in the alternative, region analyzer 50 may assign the unresolved region to the object if current attributes of the unresolved region are more consistent with attributes in the object model of the object than attributes in the object model of the occluding object. Finally, in the case that an unresolved region cannot be resolved within a certain threshold, e.g., it is too distant from any region, it is immediately adjacent to both regions, the region has similar attributes to both regions, etc., the region may be designated as ambiguous, as shown in process 267, and may, for instance, be discarded from further analysis.

In the alternative, or in addition, region analyzer 50 may use other methods to assign the unassigned pixels to objects. One alternative method may be to assign class probabilities for the object to belong to object A or B for each pixel, based on one or more attributes, such as color, texture, proximity to or contiguity with objects, as shown (in phantom) in step 270. These probabilities can be used in further processing or can be transformed, or turned into discrete class labels, as shown in step 275, based on the use of a method such as a Markov Random Field to determine a local or global optimum assignment of the unresolved region based on individual region likelihoods and a boundary penalty. An analysis of this type may result in a dividing of unresolved region 330 between object A 320 and object B 325.

Naturally a combination of different approaches may be used to sequentially or iteratively label regions of pixels of unassigned regions to the objects, or to reassign previously assigned pixels or regions to the objects, or to the "discarded" class. For instance, step 260 may be iterated to propagate class labels across large regions though adjacency. Each of the methods may use discrete classifications or soft, e.g. probabilistic, class assignments.

Figure 4:
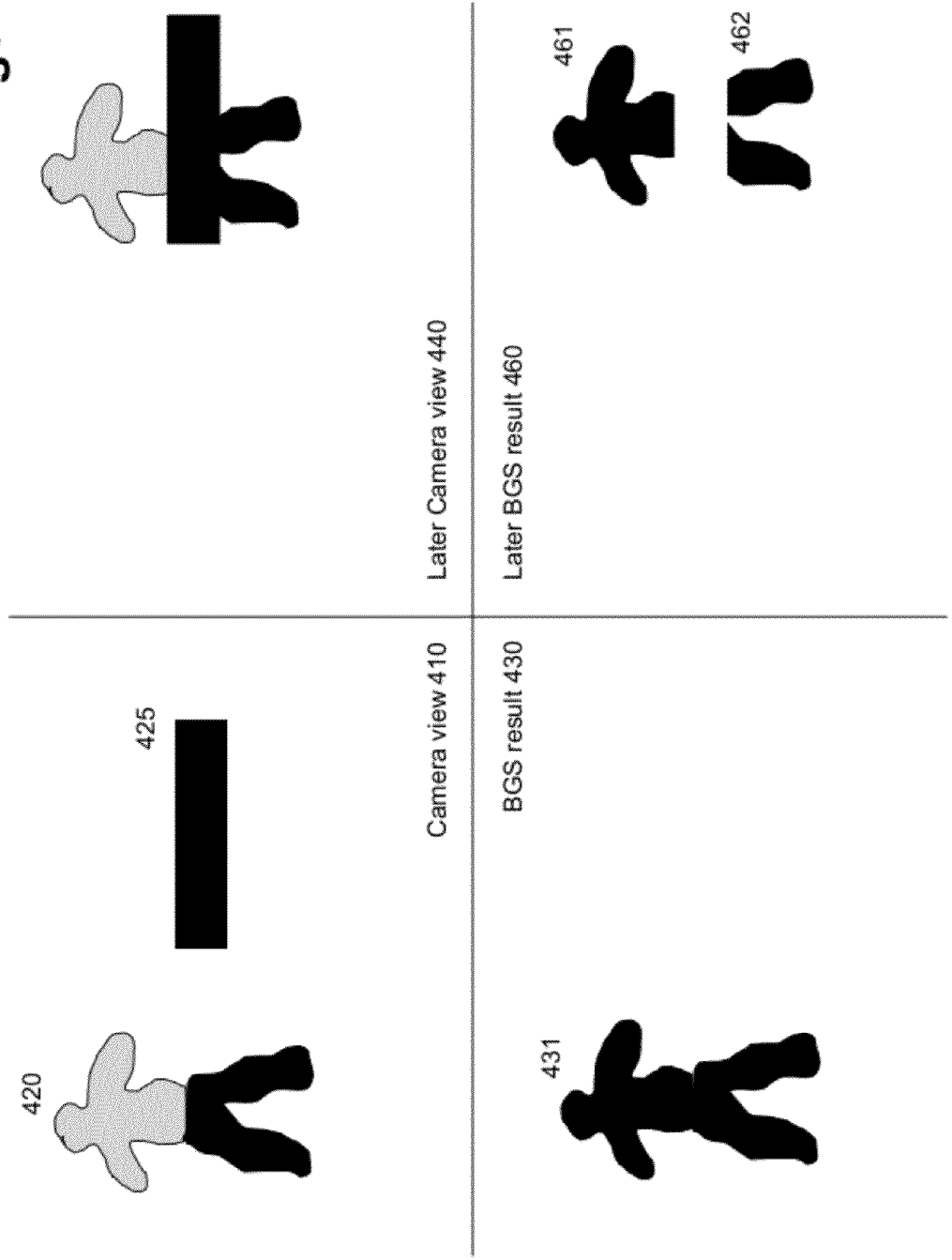
FIG. 4 shows an illustration in which a moving object that is for some time detected as two objects may be resolved according to one embodiment of the claimed invention.

Referring now to FIGS. 4-5 fission determinator 52 determines when to fuse together two objects that have been detected independently and when to separate a single object into two pieces. For example, subfigure 510 of FIG. 5 shows two people 520, walking side-by-side who enter the field of view of image capture device 18, e.g., a video surveillance system. Initially they will appear as a single foreground blob 545, in the BGS result 530, and be tracked as a single object, whose track, 540 is shown. If those two people then separate and walk in different directions, 550, the foreground blob 545 will split into two pieces, 570, 580, causing a situation that is known as a "split," which may be a problem for conventional video tracking systems. Rather than simply starting two new tracks, one for each object, and thus losing information about the relationship with the former track or continuing to track both objects as one, that just appears to be made up of two areas of pixels, fission determinator 52 will use object detector 42, object model constructor 44, and object tracker 46 to maintain two separate tracks 575 & 585 for the two objects, albeit recording that they were contiguous for some initial period.

Referring now to FIG. 4, a person 420, is shown wearing pants that have a particular attribute such color, texture, etc., who enters the field of view of video imaging device in a room having a different background attribute, in camera view 410. Person 420 then walks, in later camera view 440, in front of an object 425 having attributes that are similar to those of the pants. Background subtraction will initially generate output 430, containing a single foreground region 431, for the person, but will then, 460, generate two foreground regions, 461, 462. In this case the foreground region again splits into two. Fission determinator 52 provides a way to continue tracking the person as a single object.

Figure 6:
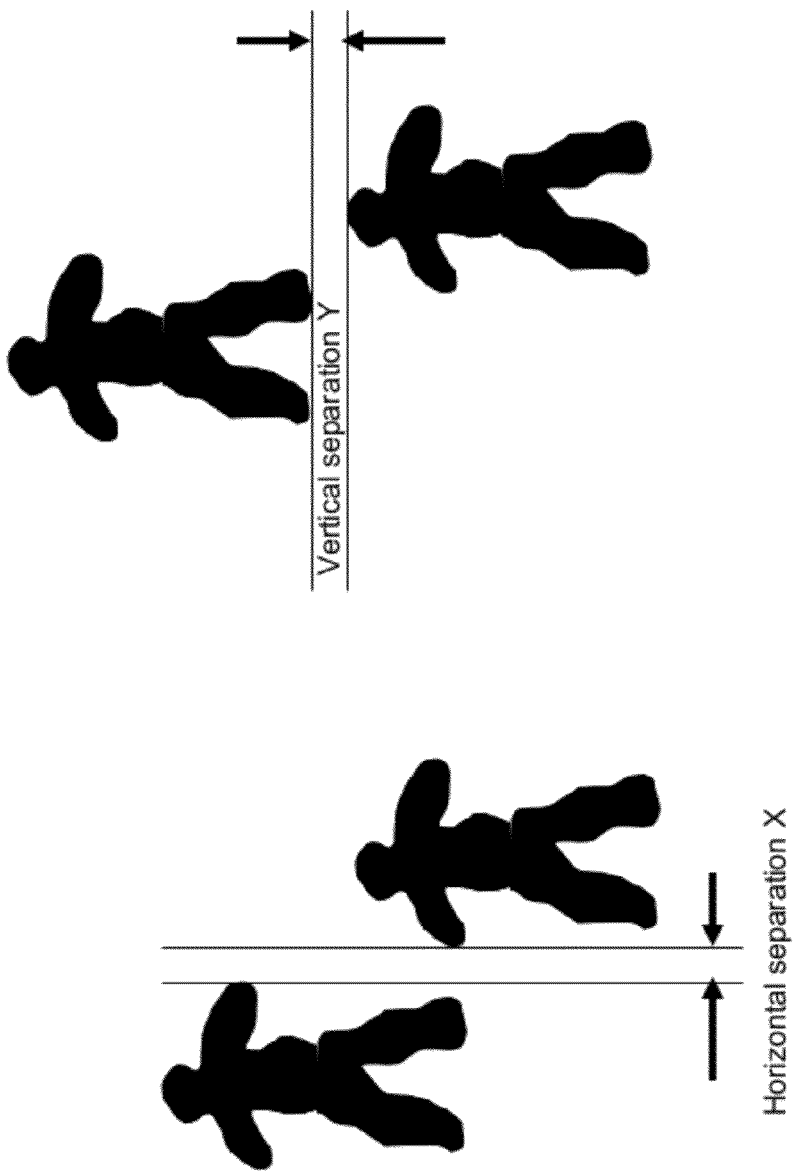
FIG. 6 shows an illustration of two objects, formerly overlapping and tracked as a single object that has become separated by a gap according to one embodiment of the claimed invention.

To deal with these related problems, fission determinator 52 creates a "fission" and/or "fusion" structure that keeps track of an object's tendency to manifest itself as multiple foreground regions. To deal with the normal fragmentation of an object caused by background subtraction errors, any foreground regions that are close to a tracked object are assigned to that object and tracked with it. However the fact and nature of the fragmentation are recorded in the fission structure created by fission determinator 52, which accumulates evidence for the division of the object into two or more parts. In one embodiment, the fission structure keeps track of the separation of the two largest regions constituting the object, as well as the duration for which the object has been detected as two or more regions. At every incoming frame if the object is detected as one contiguous region, the fission structure is reset. If two or more regions are detected, the separation between them is measured and stored in the fission structure (separation may be recorded as the width of the gap between them vertically and or horizontally, and the history of the separation may be stored for a period of time, to enable calculation of the average or trend of the separation over time). If the separation duration has lasted more than some threshold period (measured in time or frames of video) then the object is considered for separation into two distinct objects. Determination of the separation will depend on one or more of the factors stored in the fission structure. One such criterion might be that if the X or Y gap, as shown in FIG. 6, is greater than a threshold and the said gap is increasing, then the object is split into two.

Separation is carried out by dividing the model into two pieces and creating a temporal association for each piece. The track history up to the split point can be assigned to the temporal association for one of the new objects (e.g. the one with the larger area), or it might be duplicated so that the temporal associations for both objects contain the full track history. This track history may be shifted to reflect the relative positions of the two objects. It is also possible to use information stored in the fission structure to reconstruct the correct history in recent frames, and also to correct errors that may have occurred because the objects were being incorrectly tracked as one.

Naturally such a system can be extended to handle objects that split into multiple pieces (e.g. a crowd of people dispersing) but binary splits as described above are simpler to handle and will eventually result in the appropriate number of splits in such cases.

A similar situation may happen that view 440 of FIG. 4 is seen without seeing view 410. In this case the person enters and is detected as two separate blobs, so is incorrectly tracked as two objects. In this case we wish to determine that the blobs form a single object and track it as such. Such a determination will be greatly helped by the knowledge of the size of a person in the image, but if objects of different sizes and types are to be tracked, this knowledge will be hard to exploit. Another way of determining that two blobs are actually part of the same object is to observe their behavior. In the case illustrated in 440, the objects will stay close to each other and tend to move in the same way. While leg or arm movements may cause the parts to move relative to each other, these may well be small compared to the overall movement exhibited by both object pieces.

Even if the person is later detected as a single foreground region, 431, the system may continue to track two separate objects, as it is not evident that it should be a single object, rather than, say two people who have moved close together (i.e. what would be observed if BGS result 560 was followed by BGS result 530). To handle this situation, fusion determinator 52 maintains a "fusion" structure that records information about the movement of objects relative to one another. In practice it may only be necessary to record "fusion" data for objects that are close to one another (say separated by a distance less than the height of a person in the image, h). In a preferred embodiment, for each tracked object we store a list of all those objects that are within some threshold distance h, together with the history shortest distance between the objects recorded for each frame. At every frame a "fusion" process determines whether there is enough evidence to decide that the objects are infact one and to merge them. This decision can depend on a number of factors, but in an example embodiment, this might require that the objects have been closer than h/2 for more than t seconds, with a relative velocity never more than a threshold v, where t and v will depend on many factors such as the camera position and scene observed, and may be learnt automatically or set manually.

If the two objects move consistently in this way for a time t, fusion determinator 52 may consider them to be a single object and their models can be merged, and the track history in their temporal associations updated accordingly—for instance creating a single temporal association having a joint history which is the average of the original two histories for the time period where both objects were being tracked.

Henceforth the merged object can be tracked as a single object. It may be desirable to inhibit the previously mentioned splitting process after a merge operation, and vice versa, or to maintain separate tracks for the two objects for a period to make a later determination if the merge decision was valid.

Figure 7:
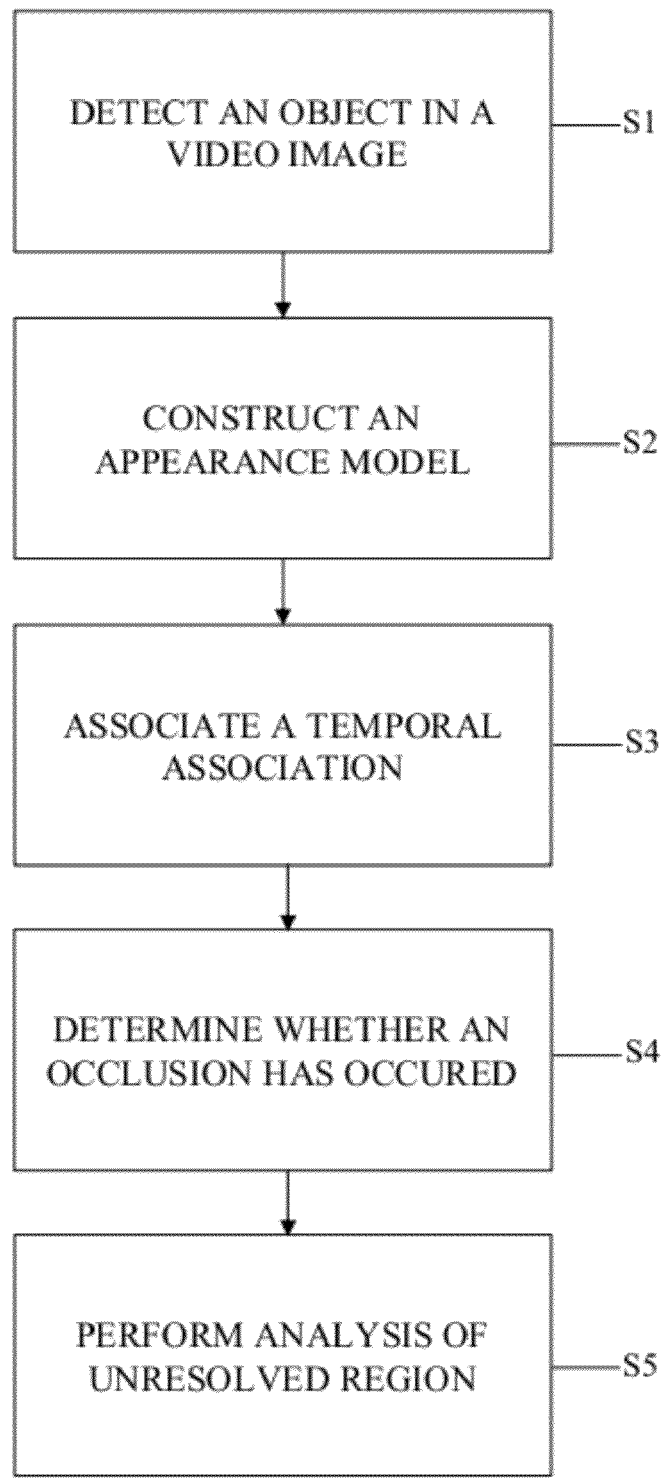
FIG. 7 shows an illustrative method flow diagram according to one embodiment of the present invention.

Turning now to FIG. 7, a flow chart of a method according to an embodiment of the present invention is depicted, which is described with reference to FIG. 1. In process S1, object detector 42 is used to detect an object in a video image. The object may include an occlusion or may be a single object. In process S2, object model constructor 44 constructs an object model based on the object. The object model includes attributes of the object such as color, texture, and expected position of the object. In process S3, object tracker 46 associates a temporal association with the object. This temporal association may include such parameters as a direction vector and speed of the object.

In process S4, occlusion determinator 48 determines whether an occlusion has occurred. This determination could be made for an occlusion in which two objects merge or become close enough for the system to determine that it is likely that the objects have merged to occupy the same space in video image 19 with respect to video capture device 18. In process S5, region analyzer 50 performs analysis of regions that have not been resolved as being assigned to a portion of an occlusion to allocate the regions to one or neither of the objects. This analysis may take the form of an initial analysis and assignment and an advanced analysis, or, in the alternative, only the advanced analysis may be performed.

While shown and described herein as a method and system for resolving an occlusion in a video image, it is understood that the invention further provides various alternative embodiments. For example, in one embodiment, the invention provides a computer-readable/useable medium that includes computer program code to enable a computer infrastructure to resolve an occlusion in a video image. To this extent, the computer-readable/useable medium includes program code that implements the process of the invention. It is understood that the terms computer-readable medium or computer useable medium comprises one or more of any type of tangible embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer a service for resolving an occlusion in a video image. In this case, the service provider can create, maintain, support, etc., a computer infrastructure, such as computer infrastructure 12 (FIG. 1) that performs the process of the invention for one or more entities. In return, the service provider can receive payment from the entity(s) under a subscription and/or fee agreement and/or the service provider can receive payment from the sale of advertising content to one or more third parties.

In still another embodiment, the invention provides a computer-implemented method for resolving an occlusion in a video image. In this case, a computer infrastructure, such as computer infrastructure 12 (FIG. 1), can be provided and one or more systems for performing the process of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

I claim:

1. A method for determining, if an object has split, whether the object should be classified into multiple objects, comprising:
    creating a fission model that tracks a tendency of the object to include multiple non-contiguous regions;
    tracking, in association with the object, a region that is in close proximity with the object;
    accumulating, based on the fission model, evidence that the region and the object should be separate;
    making, based on the accumulated evidence, a determination that the region and the object should be classified into multiple objects;
    creating, based on a positive determination, a temporal association for each of the region and the object;
    assigning, based on the positive determination, a track history to the temporal association of at least one of the region or the object; and
    tracking the region and the object as separate objects.

2. The method of claim 1 wherein the evidence includes at least one of:
    whether a gap between the multiple objects has exceeded a gap threshold;
    whether the gap between the multiple objects is increasing; or
    whether a time period that the object has remained split has exceeded a threshold time period.

3. A method for determining whether multiple objects should be classified as a single object, comprising:
    creating a fusion model that tracks a tendency of the multiple objects to behave in a similar manner;
    tracking, in association with an object, one or more other objects that are in close proximity with the object;
    accumulating, based on the fusion model, evidence that the multiple objects should be classified as one object;
    making, based on the accumulated evidence, a determination that the multiple objects should be classified as one object;
    creating, based on a positive determination, a single temporal association having a joint history of the multiple objects, the temporal association including an average of tracking histories of the multiple objects; and
    tracking the objects as one object.

4. The method of claim 3, wherein the evidence includes at least one of:
    whether a comparison, in the case that one of the two objects is determined to be an object of a particular type, of a size of the object with the size of the object of the particular type falls outside of a known object type threshold;
    whether a gap between the multiple objects remains constant within a gap threshold; and
    whether the temporal association of each of the multiple objects is similar within a temporal association threshold.

* * * * *